United States Patent [15] 3,645,852
Axen et al. [45] Feb. 29, 1972

[54] METHOD OF BINDING WATER-SOLUBLE PROTEINS AND WATER-SOLUBLE PEPTIDES TO WATER-INSOLUBLE POLYMERS USING CYANOGEN HALIDE

[72] Inventors: Rolf E. A. V. Axen, Simonsbo, Upplands Balinge; Jerker Olof Porath, Karlsrogatan 42; Erik Sverker Ernbach, Vaktgatan 8, both of Uppsala, all of Sweden

[73] Assignee: Pharmacia AB, Bjorkgatan 30, Uppsala, Sweden

[22] Filed: Mar. 6, 1970

[21] Appl. No.: 17,336

Related U.S. Application Data

[63] Continuation-in-part of Ser. No. 729,914, May 17, 1968, abandoned.

[30] Foreign Application Priority Data

May 23, 1967 Sweden.................................7169/67

[52] U.S. Cl............................195/68, 195/63, 195/DIG. 11, 195/103.5 R, 260/112 R, 260/112.7, 424/1, 424/12, 424/94
[51] Int. Cl..........................................C07g 7/00, C07g 7/02
[58] Field of Search......................195/63, 68, 63 P; 260/112

[56] References Cited

UNITED STATES PATENTS 2,882,250 4/1959 Baker.........................................260/6
3,167,485 1/1965 Katchalski et al. .......................195/63
3,278,392 10/1966 Patchornik ...............................195/63
3,507,661 4/1970 Ofstead...................................260/8 X

FOREIGN PATENTS OR APPLICATIONS 84,196 1/1958 Denmark
993,961 6/1965 Great Britain

OTHER PUBLICATIONS

Nature, Vol. 188, 1960 Bar-Eli et al., pp. 856-857
Immunochemistry, Vol. 2, pp. 293-298, 302-306 and 312-320 Weliky et al. 1965
Ann. Rev. of Biochemistry, Vol. 35, part II, 1966. pp. 873-880 and 896-901, Silman et al.
Nature, Vol. 214, June, 1967, Axen et al., pp. 1302-1304

Primary Examiner—Howard E. Schain
Attorney—Fred C. Philpitt

[57] ABSTRACT

Cyanogen halides are employed for binding water-soluble proteins and water-soluble peptides containing a primary or secondary amino group to a water-insoluble polymer containing one or more hydroxyl and/or primary and/or secondary amino groups. The invention is useful, among other things, for binding water-soluble enzymes to water-insoluble polymers while preserving the activity of the enzyme.

8 Claims, No Drawings

METHOD OF BINDING WATER-SOLUBLE PROTEINS AND WATER-SOLUBLE PEPTIDES TO WATER-INSOLUBLE POLYMERS USING CYANOGEN HALIDE

This application is a continuation-in-part of Ser. No. 729,914 filed May 17, 1968 and now abandoned.

The present invention concerns a method of binding, by covalent bonds, water-soluble proteins and water-soluble peptides containing one or more groups of the formula —YH, in which —YH represents a primary or secondary amino group, to water-insoluble polymers containing one or more groups of the formula —XH, in which —XH represents a hydroxyl group or a primary or secondary amino group. The group —XH as well as the group —YH contains a reactive hydrogen atom H.

The invention is characterized in that the water-insoluble polymer containing one or more groups of the formula —XH is reacted with a cyanogen halide and with the water-soluble protein or water-soluble peptide. The reaction is carried out in an aqueous weakly alkaline medium. It is thus carried out in the presence of water, which is of special significance, and the temperature is variable, for example, in the range of from 0° to 50° C. The reaction is based on the formation of bridges with covalent bonds between the water-insoluble polymer and the water-soluble protein or peptide. Investigations carried out have revealed that the bridges have the formula

wherein A is the residue of the water-insoluble polymer and B is the residue of the protein or peptide and Z stands for imino (=NH) or oxygen (=O). That Z can also stand for oxygen is due to the fact that the imino group can in certain cases convert into oxygen by hydrolysis.

According to the invention, the reaction can be carried out in one or more stages. As a rule it is carried out, however, in two stages. The first of these stages is commonly effected in such a manner that the water-insoluble polymer containing one or more groups having the formula —XH is contacted with a cyanogen halide, the latter being present in the form of the pure substance or a solution thereof. As a cyanogen halide, there may usually be used the iodo-, chloro-, or bromocompound or optionally a mixture thereof. The reaction is carried out under alkaline conditions, which are provided by the addition of a suitable alkaline reacting substance to the aqueous reaction medium, such as sodium hydroxide. Suitable pH values are primarily such values in the range of from 8 to 13. If —XH is a primary or secondary amino group, it is possible to work in a more weakly alkaline medium than when —XH is a hydroxy group. The skilled person can by simple preliminary tests readily determine the suitable pH value or pH interval. The reaction can be carried out at different temperatures, for example, in the range of from 0° to 50° C. When working in aqueous solution, certain losses of cyanogen halide arises due to part of the latter being consumed by hydrolysis. The reaction results in the formation of reactive derivatives of the water-insoluble polymer which can then immediately or optionally after isolation, be further reacted with the water-soluble protein or water-soluble peptide. The reactive derivative as formed can also be stored under suitable conditions and later be reacted with the biopolymer. Prior to being bound to the biopolymer, a reactive derivative based on a water-insoluble polymer can be purified, for example by washing.

The second stage of the process is preferably carried out under weakly alkaline conditions at a temperature which can, for example, be in the range of from 0° to 50° C., such as at room temperature. It is an advantage of the invention that this stage can be carried out in the presence of water.

An important advantage of the process of the invention is that sensitive water-soluble proteins or water-soluble peptides containing one or more groups —YH can be bound to water-insoluble polymers of the kind set forth in the preamble, without the proteins or peptides being destroyed or undergoing any other undesired change. It is possible to bind the proteins and the peptides without the peptide linkages being broken up. According to the invention it is thus, for example, possible to bind water-soluble enzymes to water-insoluble polymers essentially without losses in enzyme activity and to bind an antibody in solution to the insoluble polymer, without loosing the ability of the antibody to bind its antigen. The process according to the invention can thus be said to represent a surprisingly mild and simple method of binding the water-soluble protein or water-soluble peptide to water-insoluble polymers of the kind given above and represents a very valuable method of insolubilizing water-soluble proteins and peptides.

According to the invention, the water-insoluble polymer can be a water-insoluble polysaccharide or a water-insoluble derivative of a polysaccharide which contains hydroxyl groups and/or primary and/or secondary amino groups. An example of a water-insoluble polysaccharide is cellulose. Examples of insoluble polysaccharide derivatives are cross-linked polysaccharides, for example, cross-linked dextran, starch, dextrin, and hydroxyl group-containing derivatives of such polysaccharides such as hydroxyethyl group-containing derivatives or amino group-containing derivatives such as p-aminophenoxyhydroxypropyl group-substituted cross-linked dextran and starch. Another example is agarose. A still further example is water-insoluble cross-linked polyvinyl-alcohol and synthetic polymers containing amino groups.

The average molecular weight of the selected polymer, containing one or more groups —XH, can vary within very broad limits. Preferably it should, however, by more than about 1,000, for example, more than about 10,000.

According to the invention, the polymer is insoluble in water, but it can be swellable in water. In this connection, it can consist of a cross-linked three-dimensional hydroxyl group-containing network which is insoluble but swellable in water. As examples of such polymers may be mentioned copolymers of dextran with a bifunctional substance, such as epichlorohydrin, such copolymers being characterized by presenting a varying ability of absorbing water. Copolymers of other polysaccharides or other hydroxyl compounds with bifunctional substances may come in question, such as copolymers of saccharose and of sugar alcohols, such as sorbitol, mannitol, and polyvinyl-alcohol. As copolymers may also be mentioned those which are substituted by primary or secondary amino groups such as p-aminophenoxyhydroxypropyl groups.

As water-soluble proteins and peptides, containing one or more groups of the formula —YH, which are to be subjected to the binding reaction with the reactive derivative according to the invention may be mentioned enzymes, antibodies, protein and/or peptide hormones or antigenic proteins. The products according to the invention are of great interest. An enzyme which is bound to a water-insoluble polymer according to the invention can thus be packed into a bed and this bed be utilized as a reactor for chemical reactions. In this connection, a solution of a substrate can be passed through the enzyme bed to convert this substrate into a valuable product. The reaction is automatically stopped when the solution leaves the bed. The solid enzyme can be used for a long time in a continuous operation.

Another valuable example is antibodies bound to water-insoluble polymers according to the present invention. Such products can be combined specifically with the corresponding antigen, for example, for the analytical determination of the latter.

EXAMPLE 1

Binding of chymotrypsin to a copolymer of dextran with epichlorohydrin

A. Activation of the copolymer by reacting with cyanogen bromide

Two hundred milligrams copolymer of dextran with epichlorohydrin (SEPHADEX G–200 from Pharmacia Fine Chemicals AB, Uppsala, Sweden) a water-insoluble gel product which is swellable in water were combined with 8 ml. of an aqueous solution containing 25 mg. of cyanogen bromide per ml. of water. The reaction was allowed to take place at 23° C. while stirring and the pH of the mixture was maintained at 11.5 using an automatic titrator adding 2 M sodium hydroxide solution. The reaction time was 6 minutes. The product was washed rapidly with suction on a glass filter with cold water, and used for the next stage of the reaction.

B. Binding with chymotrypsin

The activated copolymer obtained according to (A) was contacted with 200 mg. of chymotrypsin in 2 ml. of 0.1 M sodium hydrocarbonate solution, whereupon the mixture was allowed to react at 23° for 30 hours while being stirred. Subsequent to being subjected to suction on a glass filter the obtained product was washed with 0.1 M sodium hydrocarbonate solution, $10^{-3}$ M hydrochloric acid, water, 0.5 M sodium chloride solution, water and a water-acetone mixture with increasing concentrations of acetone, and finally with pure acetone. The shrunken product was then dried. The result obtained upon analysis of amino acids was a content of 200 mg. of protein per gram of dried final product. The product obtained has enzymatic activity and is used, for example, for analytical procedures.

EXAMPLE 2

Binding of insulin to a copolymer of dextran with epichlorohydrin

A. Activation of the copolymer by reacting with cyanogen iodine.

Fifty milligrams of the water-insoluble copolymer disclosed in Example 1 were contacted with 2 ml. of an aqueous solution containing 30 mg. of cyanogen iodide per ml. of water. The reaction took place at 23° C. while stirring, the pH of the mixture being 11 and the reaction period 25 minutes. In other respects the sequence of steps was identical to that in Example 1.

B. Binding with insulin

The activated copolymer obtained according to A was added with 0.5 M sodium hydrocarbonate solution and the residue removed from the gel by suction. This was then contacted with 11.5 mg. of dezincificated insulin (from swine) in 150 $\mu$l. of 0.5 M sodium hydrocarbonate solution. The reaction took place for 5 hours at 23° C. The product was washed and dried in a manner similar to that described in Example 1. The result obtained upon analysis of amino acids was a binding yield of 24 mg. of insulin per gram of dried reaction product. The insoluble product is able to bind antibodies against insulin. The product can be used for analytical procedures.

EXAMPLE 3

Binding of γ-globulin (antichorionic gonadotropin) to amino group-substituted (p-aminophenoxyhydroxypropylether) copolymer of dextran with epichlorohydrin A. Activation of p-aminophenoxyhydroxypropylether of copolymerisate One hundred milligrams of p-aminophenoxyhydroxypropylether of the water-insoluble cross-linked dextran containing approximately 250 $\mu$mol of amino groups per gram of amino polymer were swollen in 3 ml. of water. Fifty milligrams of cyanogen bromide were dissolved in 3 ml. of water and added to the gel while stirring; the pH was adjusted to 8 and maintained at this level for 5 minutes by adding 0.5 M of sodium hydroxide. Subsequent to the termination of the reaction the gel was washed rapidly with cold water and 0.1 M sodium bicarbonate solution, and was then immediately used for the binding process.

B. Binding with γ-globulin (antichorionic gonadotropin)

Antiserum against human chorionic gonadotropin was obtained from rabbits after injection of the hormones in Freund's adjuvant. The immunoglobulins were precipitated by adding half the volume of saturated ammonium sulphate solution at room temperature, which was repeated twice. The last-obtained precipitate was dissolved in and dialyzed against 0.1 M sodium bicarbonate solution.

0.5 ml. of antichorionic gonadotropin solution corresponding to 0.5 ml. of antiserum were reacted with the activated polymer for 5 hours at 23° C. The product was washed with 0.1 M of sodium bicarbonate solution, 0.5 M of sodium chloride solution, water, $10^{-4}$ M of hydrochloric acid and water. A portion of the product was shrunken and dried for analysis and was found to contain about 3.5 mg. of protein per gram of polymer. The bound antibodies are capable of binding the corresponding antigen (chorionic gonadotropin).

The majority of the product was used for radioimmunological determinations of chorionic gonadotropin. The product showed splendid properties for binding chorionic gonadotropin and can be used for analytical procedures.

EXAMPLE 4

Binding of oxytocin to cellulose

A. Activation of cellulose by reacting with cyanogen bromide

Cellulose (Munktell Powder No. 400) was mercerized by treatment with 17.5 percent sodium hydroxide solution at 0° C. for 24 hours and in a nitrogen gas atmosphere. Fifty milligrams of mercerized cellulose was activated with 2 ml. of a cyanogen bromide solution containing 25 mg. of cyanogen bromide per ml. of water at a pH of 11 for 12 minutes at ° C. The product was washed with cold water and added with 0.1 M of a sodium hydrocarbonate solution; the residue being removed by suction.

B. Binding with oxytocin

The activated cellulose was reacted with 10 mg. of oxytocin in 1 ml. of 0.5 M sodium hydrocarbonate solution for 10 hours at 23° C. The obtained product was washed and shrunken as described in Example 1(B). Analysis resulted in a binding yield of 75 mg. of oxytocin per gram of dried reaction product.

EXAMPLE 5

Binding of glucose oxidase to agaros

A. Activation of agaros by reaction with cyanogen bromide

Water-swollen, ball-shaped agaros particles (Sepharose 2B) were subjected to suction on a glass filter. 3.9 g. (corresponding to 100 mg. of shrunken and dried agaros) were added with 4 ml. of a cyanogen bromide solution containing 25 mg. cyanogen bromide per ml. of water, whereafter the activation process was effected analogously with Example 1(B) at pH 11 by adding 2 M sodium hydroxide solution for 6 minutes using an automatic titrator at 23° C. The activated product was washed on a glass filter with 1 l. of ice water and was finally washed rapidly with 0.1 M phosphate buffer having a pH of 7.4.

B. Binding with glucose oxidase

The activated polymer was reacted with 24 mg. of glucose oxidase (purified from Worthington Biochemical Corp.) which was dissolved in 1 ml. of 0.1 M phosphate buffer at pH 7.4. The binding process took place for 10 hours with slow rotation of the reaction vessel. The gel conjugate was placed in a column and washed with 1 liter of 0.1 M acetate buffer of pH 4.6, this amount being pumped by means of a pump through the column for 10 hours.

A portion of the gel was removed, shrunken with acetone, dried and analyzed with respect to protein. The amount of bonded glucose oxidase was calculated therefrom to reach 30 mg. per g. of dried polymer conjugate.

The bound enzyme was found to have considerable activity, and the catalytic column could be used for determining glucose in samples. The column was also found to possess good chromatographic properties. The water-insoluble product is a valuable reagent for analytical procedures.

EXAMPLE 6

Binding of chymotrypsin to polyacrylamide polymer substituted by aromatic amino groups A. Activation of polymer by reacting with cyanogen bromide Cross-linked polyacrylamide polymer substituted by p-aminophenyl groups, the major structural features of which polymer are evident from the following formula was used (Enzacryl; a product marketed by The United Kingdom company Koch-Light Laboratories Ltd., Colmbrook, Buckingham Shire)

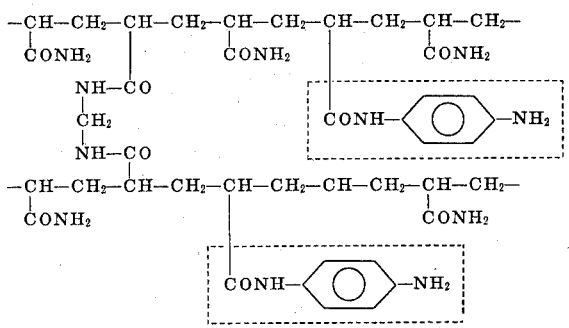

In order to activate the polymer, 100 mg. thereof were added with 4 ml. of a cyanogen bromide solution containing 25 mg. of cyanogen bromide per ml. of water, whereafter the activation process was effected at pH 9.0 for 6 minutes at room temperature. The activated gel was washed on a glass filter with suction for 5 min. with 0.1 M sodium bicarbonate solution.

B. Binding with chymotrypsin

The activated gel was suspended in 2 ml. 0.1 M sodium bicarbonate solution and 25 mg. chymotrypsin was added. The coupling was allowed to proceed at 4° and under slow stirring for 16 hours.

The resulting product was washed at room temperature in a small column. The washing solutions were supplied at ml./h. by a peristaltic pump. The following washing solutions were used in order: 0.1 M sodium bicarbonate solution (24 hours); $10^{-3}$M hydrochloric acid (1 hour); 0.5 M sodium chloride solution (24 hours); distilled water (3 hours); 0.01 M sodium acetate buffer of pH 5.4 (1 hour). The product can be stored as a suspension in the last-mentioned buffer.

The enzymatic activity of the conjugate was determined toward a 14-mM solution of N-acetyl-L-tyrosine ethyl ester in an aqueous medium containing 5 percent of ethanol. The substrate was hydrolyzed at a rate of 3.5 $\mu$mol per min per mg. of dried conjugate. The content of protein was 105 mg. per g. of dried conjugate. The activity of the fixed enzyme was therefore about 35 $\mu$mol per min. per mg. The activity of the free chymotrypsin was 180 $\mu$mol per min. per mg.

What we claim is:

1. In the method for binding, by covalent bonds
   a. a water-insoluble polymer containing at least one group of the formula —XH, wherein —XH represents a member selected from the group consisting of hydroxyl groups, primary and secondary amino groups, and
   b. a member selected from the group consisting of water-soluble proteins and water-soluble peptides containing at least one group of the formula —YH wherein —YH represents a member selected from the group consisting of primary and secondary amino groups, the improvement which comprises:
      1. first causing said water-insoluble polymer of (a) to react with a cyanogen halide in an aqueous alkaline medium,
      2. thereafter reacting the water-insoluble polymer obtained from step (1) with a member selected from the group consisting of water-soluble proteins and water-soluble peptides of the type specified in (b).

2. The method according to claim 1, wherein said water-insoluble polymer is selected from the group consisting of water-insoluble polysaccharides and water-insoluble polysaccharide derivatives containing a member selected from the group consisting of hydroxyl groups and primary and secondary amino groups.

3. The method as set forth in claim 1, wherein said water-insoluble polymer is insoluble but swellable in water.

4. The method as claimed in claim 1, wherein said water-insoluble polymer is a cross-linked three-dimensional hydroxyl group-containing network.

5. The method as claimed in claim 1, wherein the polymer is a copolymer of dextran with epichlorohydrin.

6. The method as set forth in claim 1, wherein the water-soluble peptide is an enzyme.

7. The method as set forth in claim 1, wherein the member selected from the group consisting of water-soluble proteins and water-soluble peptides is an antibody.

8. The method as claimed in claim 1, wherein the member selected from the group consisting of water-soluble proteins and water-soluble peptides is an antigen.

* * * * *